United States Patent [19]

Lovenguth

[11] Patent Number: 4,764,550

[45] Date of Patent: Aug. 16, 1988

[54] TETRAHALOPHTHALATE ESTERS AS FLAME RETARDANTS FOR POLYPHENYLENE ETHER RESINS

[75] Inventor: Ronald F. Lovenguth, Doylestown, Pa.

[73] Assignee: Pennwalt Corporation, Philadelphia, Pa.

[21] Appl. No.: 896,896

[22] Filed: Aug. 15, 1986

Related U.S. Application Data

[63] Continuation-in-part of Ser. No. 777,043, Sep. 17, 1985, abandoned.

[51] Int. Cl.$^4$ ............................ C08K 5/12; C08K 5/20
[52] U.S. Cl. .................................. 524/217; 524/219; 524/288
[58] Field of Search .................... 524/217, 219, 288

[56] References Cited

U.S. PATENT DOCUMENTS

| | | | |
|---|---|---|---|
| 2,496,852 | 2/1950 | Bohrer | 524/288 |
| 3,772,342 | 11/1973 | Foley | 524/288 |
| 3,775,165 | 11/1973 | Young et al. | 524/288 |
| 4,154,712 | 5/1979 | Lee | 524/412 |
| 4,203,931 | 5/1980 | Lee | 524/288 |
| 4,298,517 | 11/1981 | Sandler | 524/220 |
| 4,525,508 | 6/1985 | Lee | 524/141 |

FOREIGN PATENT DOCUMENTS

47-47981 4/1972 Japan .

*Primary Examiner*—Veronica P. Hoke
*Attorney, Agent, or Firm*—E. Leigh Hunt

[57] ABSTRACT

Tetrahalophthalate esters are disclosed herein as flame retardant processing aids for polyphenylene ether resins.

9 Claims, No Drawings

TETRAHALOPHTHALATE ESTERS AS FLAME RETARDANTS FOR POLYPHENYLENE ETHER RESINS

This application is a continuation-in-part application of Ser. No. 06/777,043, filed Sept. 17, 1985, now abandoned.

BACKGROUND OF THE INVENTION

This invention relates to flame retardant compositions containing at least one tetrahalophthalate ester and a polyphenylene ether resin. This invention also comprehends the method of improving the flame retardancy and processability of the polyphenylene ether resins by using these tetrahalophthalate esters.

Polyphenylene ether resins are known in the art as a class of thermoplastics which are characterized by excellent physical properties, including hydrolytic stability, dimensional stability and excellent dielectric properties. In general, they are prepared by the oxidative coupling of a phenolic compound with complex metal catalysts, e.g., a complex copper catalyst. The preparation of polyphenylene ether resins is described in Hay, U.S. Pat. Nos. 3,306,874 and 3,306,875 and U.S. Pat. Nos. 3,257,357 and 3,257,358 of Stamatoff, the teachings of which are incorporated herein by reference.

The high molecular weight polyphenylene ethers are high performance engineering thermoplastics possessing relatively high melt viscosities and softening points, that is, in excess of 250° C., and are useful for many commercial applications requiring high temperature resistance including formation of film, fiber, and molded articles.

Cisek, U.S. Pat. No. 3,383,435, which is incorporated herein by reference, discloses polyphenylene ether-styrene resin compositions including rubber-modified styrene resin-polyphenylene ether resins wherein the rubber component is of the unsaturated type such as polymers and copolymers of butadiene. Although the styrene resin component improves the moldability of the polyphenylene ethers these compositions are still difficult to process.

Polyphenylene ether/styrene resin blends comprising between about 25 and 75% of polystyrene units are available commercially from the General Electric Company under the NORYL ® trademark.

The use of brominated and/or chlorinated compounds by themselves or in combination with other materials such as organic phosphates, boron compounds, etc., as flame retardants for polyphenylene ether resin compositions are well known in the art and are exemplified by U.S. Pat. Nos. 3,257,357; 3,639,506; 3,733,307; 3,809,729; 3,867,336; 3,919,356; 3,936,414; 3,974,235; 3,939,531; 4,024,093; 4,034,136 4,073,772; 4,094,856; 4,096,117; 4,107,232; 4,191,685; 4,203,931; 4,206,154; 4,274,998; 4,280,951; 4,298,514; 4,301,062; 4,355,126; 4,403,057; 4,446,272; and 4,456,720. The aforesaid patents are incorporated herein by reference.

Tetrahalophthalate esters have been used as flame-proofing materials. For example, U.S. Pat. No. 4,098,704 describes the use of these materials as textile finishing agents. U.S. Pat. Nos. 4,298,517 and 4,397,977 disclose these compounds as flame retardants for halogenated resins. However, no teachings have been found which show the use of these compounds as flame retardants or processing aids for polyphenylene ether resins.

SUMMARY OF THE INVENTION

The present invention is directed to a composition of a polyphenylene ether resin and a flame retardant processing aid of the formula:

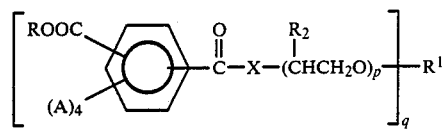

wherein (a) the ring can have all possible isomeric arrangements (b) R is selected from the group consisting of hydrogen, an alkyl or substituted alkyl of 1 to 30 carbons, hydroxyalkyl of 2 to 20 carbons, polyhydroxyalkyl of 3 to 10 carbons, and

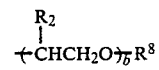

where $R^8$ is an alkyl or substituted alkyl of 1 to 18 carbons, and b is 1 to 50;

(c) $R^1$ is selected from the group consisting of hydrogen, an alkyl or substituted alkyl of 1 to 30 carbons, alkenyl or substituted alkenyl of 2 to 22 carbons,

where $R^7$ is an alkyl of 1 to 18 carbons; a polyhydroxyalkyl of 3 to 12 carbons,

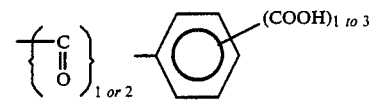

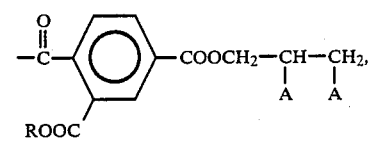

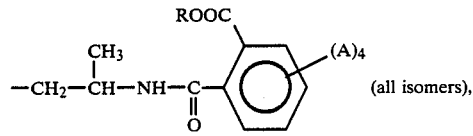

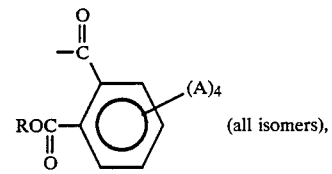

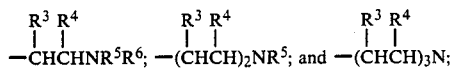

with the proviso that the valence of $R^1$ is equal to q;

(d) $R^2$ is independently selected from the group consisting of H and $CH_3$;

(e) $R^3$, $R^4$, $R^5$, and $R^6$ are independently selected from the group consisting of H and an alkyl of 1 to 18 carbons;

(f) p is an integer of 0 to 50;

(g) q is an integer of 1 to 6;

(h) X is selected from the group consisting of O or NH; and (i) A is selected from the group consisting of Cl or Br.

This invention also comprehends the method of improving the flame retardancy and processability of the polyphenylene ether resins by incorporating in the resin the tetrahalophthalate compound as described above.

In practicing this invention, the tetrahalophthalate is added to the polyphenylene ether resin in any convenient manner, such as blending or extruding in order to get a uniform composition. Flame retardant synergists such as antimony oxide ($Sb_2O_3$) may also be added if desired. In addition, other additives such as thermal stabilizers, ultraviolet stabilizers, reinforcing agents, organic polymers, mold release agents, blowing agents, colorants, and the like may also be optionally included. A further advantage of the polyoxyalkylene tetrahalophthalates as used in this invention is their improved compatibility with Noryl® resins (blends of polystyrene and polyphenylene ethers containing 25 to 75% of the former).

Representative tetrahalophthalate compounds useful in practicing this invention are as follows (where A is Br or Cl):

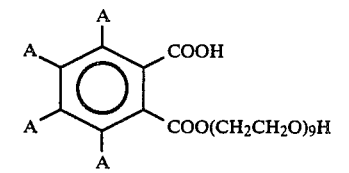

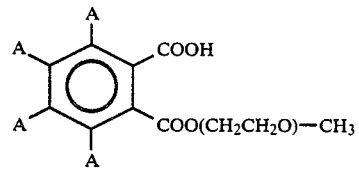

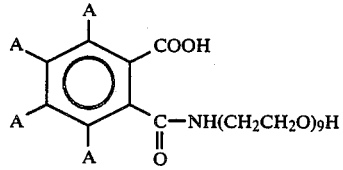

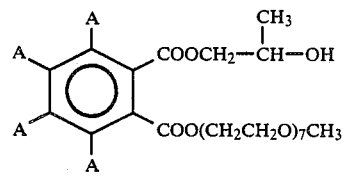

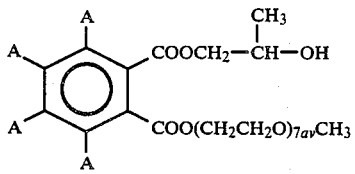

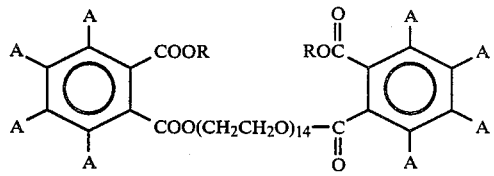

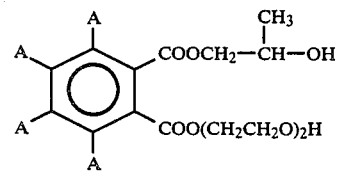

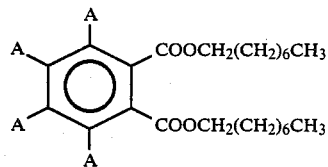

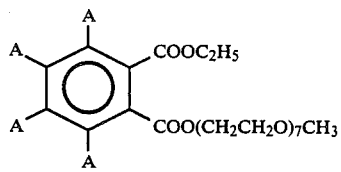

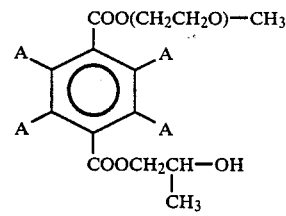

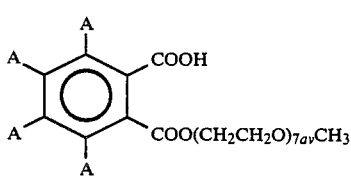

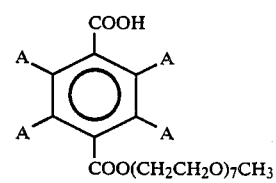

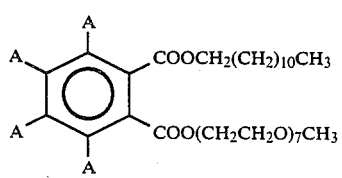

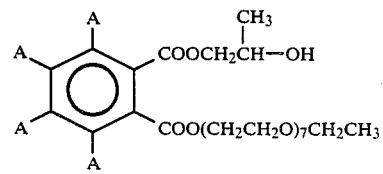

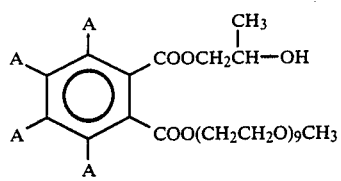
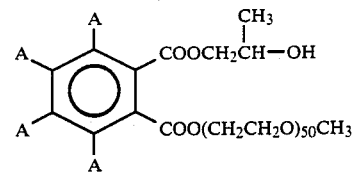
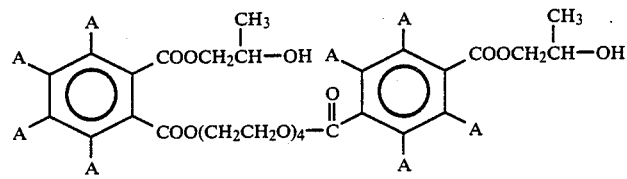
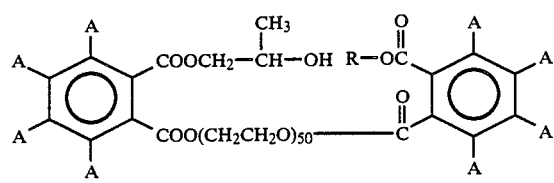
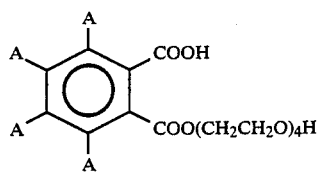
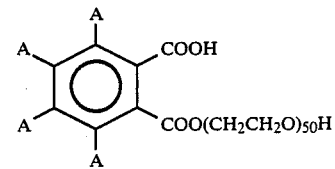
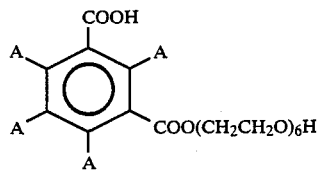
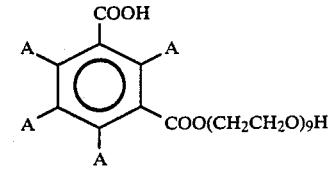
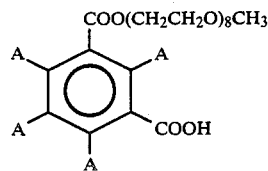
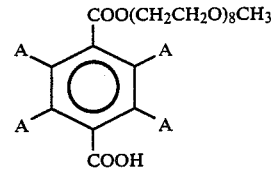
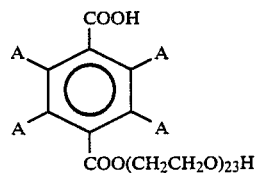
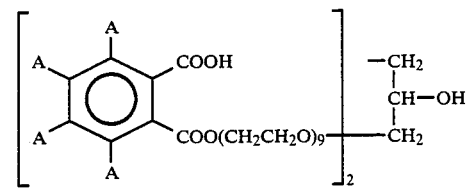
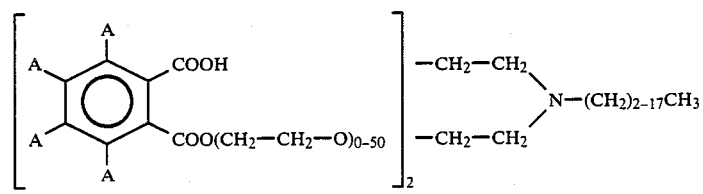

-continued
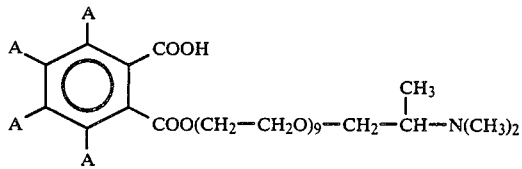
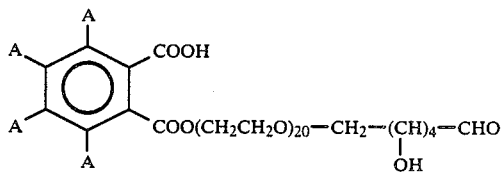
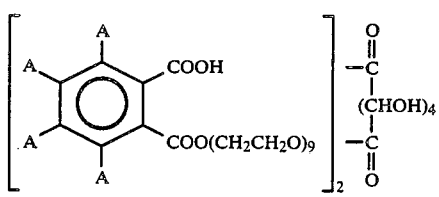
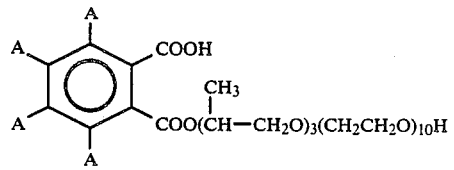
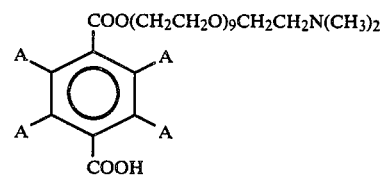
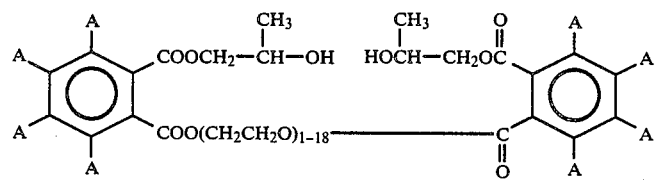
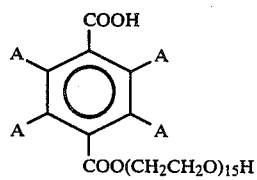
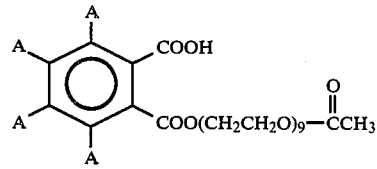
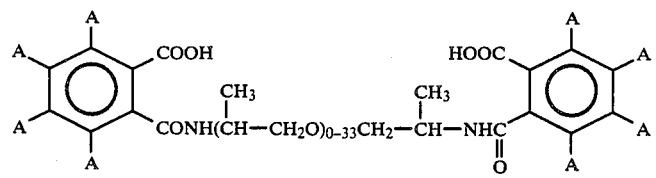
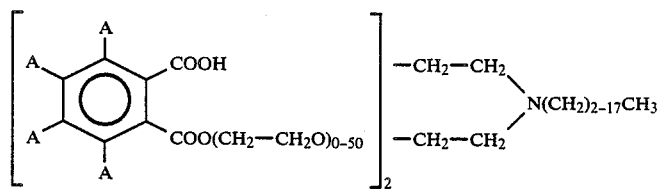
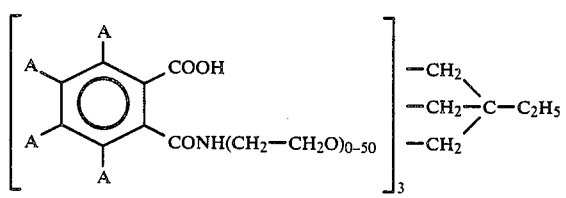
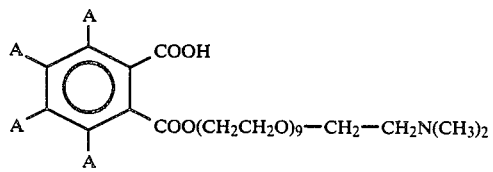

-continued
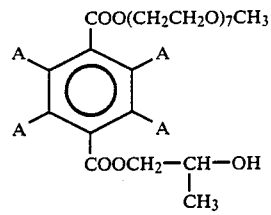 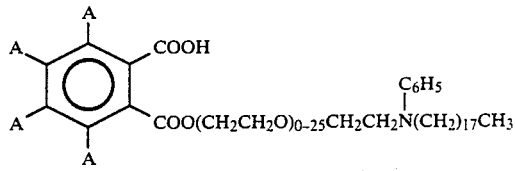
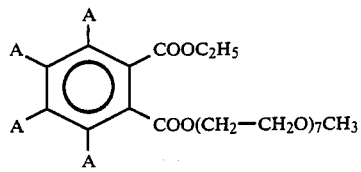 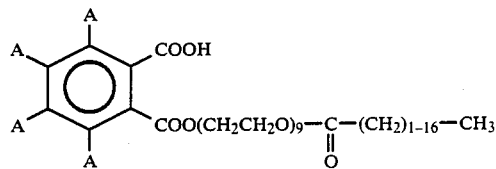
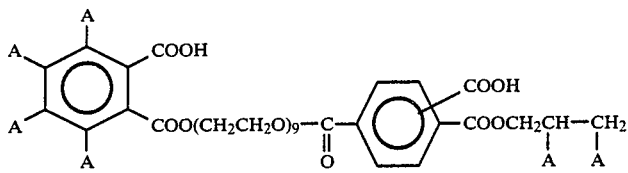 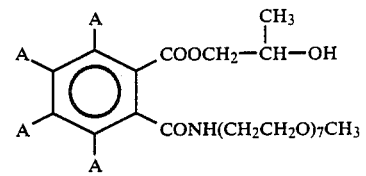
The preferred compounds are:
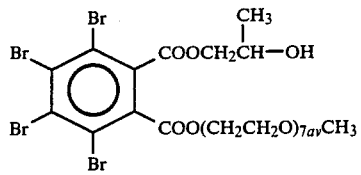 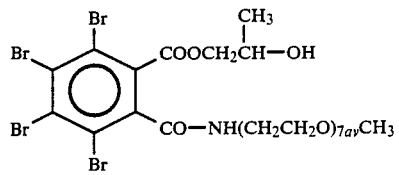
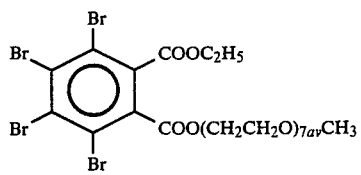 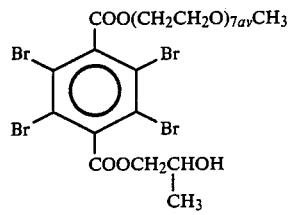
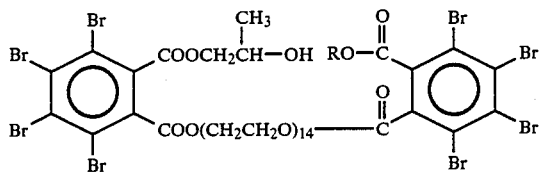 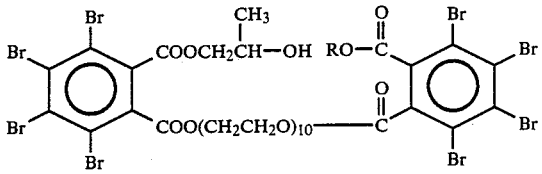
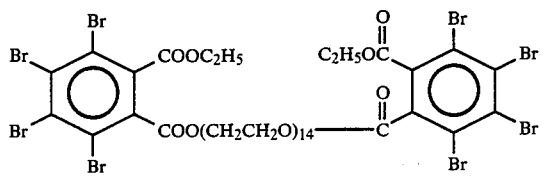
The R in the above formulas is
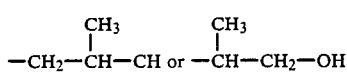
and A is Br or Cl.
The polyphenylene ether resins that may be used in the present invention are as follows:
(1) Homopolymers having repeated structural units of the formula:
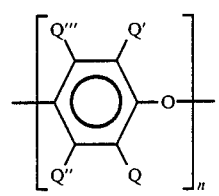

where Q, Q', Q", Q" are independently selected from the group consisting of hydrogen, hydrocarbon radicals, halohydrocarbon radicals having at least two carbon atoms between the halogen atom and phenyl nucleus and Q', Q", and Q''' in addition may be halogen with the proviso that Q and Q' are preferably free of tertiary carbon atoms; and n represents the total number of monomer residues and is an integer of at least 10. Examples of polyphenylene ethers corresponding to the above formula can be found in the above-referenced patents of Hay and Stamatoff.

(2) Copolymers with repeating units of

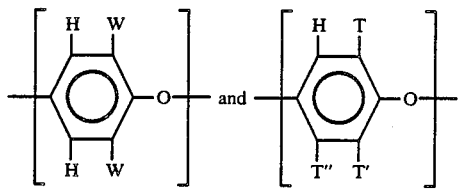

where W may be methyl, Cl, Br or I; and T, T' and T" are aryl, alkaryl, haloaryl, or arylalkyl of from 6 to 12 carbons. Examples of these copolymers can be found in U.S. Pat. No. 3,733,307.

(3) Blends of (1) or (2) with vinyl aromatic resins wherein at least 10% of the units of said vinyl aromatic resin are of the formula:

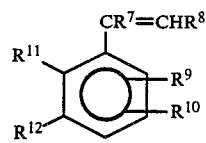

wherein $R^7$ and $R^8$ are selected from the group consisting of lower alkyl or alkenyl groups of from 1 to 6 carbon atoms and hydrogen; $R^9$ and $R^{10}$ are selected from the group consisting of chloro, bromo, hydrogen and lower alkyl of from 1 to 6 carbon atoms; $R^{11}$ and $R^{12}$ are selected from the group consisting of hydrogen and lower alkyl or alkenyl groups of 1 to 6 carbons or $R^{11}$ and $R^{12}$ may be concatenated together with hydrocarbyl groups to form a naphthyl group. Materials that may be copolymerized with the units of the vinyl aromatic monomer include those having the general formula:

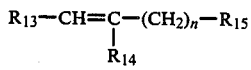

wherein $R_{13}$ and $R_{14}$ represents a substituent selected from the group consisting of hydrogen, halogen, an alkyl group of 1-4 carbon atoms, carboalkoxy or $R_{13}$ and $R_{14}$ taken together represent an anhydride linkage (—COOOC—) and $R_{15}$ is hydrogen, vinyl, an alkyl or alkenyl group having 1 to 12 carbon atoms, cycloalkyl, carboalkoxy, alkoxy-alkyl, alkyl carboxy, ketoxy, halogen, carboxy, cyano or pyridyl and n is a whole number between 0 and 9.

The general formula set forth includes by way of example, homopolymers such as polystyrene and monochloropolystyrene, the modified polystyrenes, such as rubber-modified, high-impact polystyrene and the styrene containing copolymers, such as the styrene-acrylonitrile copolymers, styrene-butadiene copolymers, styrene-acrylonitrile- alkyl styrene copolymers, styrene-acrylonitrile-butadiene copolymers, polymethylstyrene, copolymers of ethylvinylbenzene, and divinylbenzene; styrene-maleic anhydride copolymers, styrene-butadiene-styrene block copolymers and styrene-butadiene block copolymers; and styrene-butadiene-styrene maleic anhydride block copolymers. The prefered vinyl aromatic resins are the halogen-free vinyl aromatic resins.

The preferred polyphenylene ether resins are blends of (1) and (3). Especially preferred are those blends in which the vinyl aromatic resin is polystyrene or a copolymer of styrene and 1,3-butadiene. The ratio of tetrahalophthalate to modified polyphenylene ether resin blend that will impart flame retardancy to the latter may vary from 1:100 to about 1:2 depending on the application.

The compositions of this invention may also include other additives such as thermal stabilizers, ultraviolet stabilizers, reinforcing agents, organic polymers, mold release agents, blowing agents, colorants, etc. In order to illustrate the present invention, the following examples are presented. These are not to be construed as limiting the scope of the invention.

EXAMPLE 1

To 1,392 g (3.0 moles) of tetrabromophthalic anhydride were added 1,050 g (3.0 mole) of Methoxy Carbowax 350 in the presence of 22.0 g of sodium acetate. The mixture was heated at 90° C. for 8 hours in a nitrogen atmosphere. The reaction mixture was filtered hot to remove the sodium acetate. The analytical data were consistent with the assigned structure.

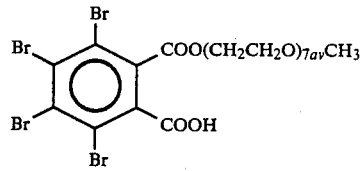

EXAMPLE 2

To the compound of Example 1 were added 348.0 g (6.0 moles) of propylene oxide and 2.0 liters of toluene. The mixture was heated at 60°-100° C. The solvent and residual propylene oxide were removed to give the product in almost quantitative yield. The analytical data were consistent with the assigned structure:

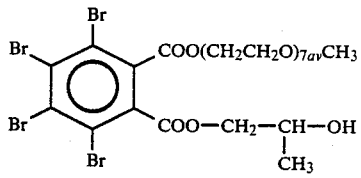

EXAMPLE 3

To 92.8 g (0.2 mole) of tetrabromophthalic anhydride is added all at once 80 g (0.2 mole) of Carbowax 400 and the mixture heated to 120°-130° C. for 2.5 hours. The desired product is isolated in essentially quantitative yield as a clear yellow viscous liquid. Calcd. Mol. Wt., 864; found 865. Calcd. % Br, 371; found, 38.5. The analytical data are consistent with the assigned structure:

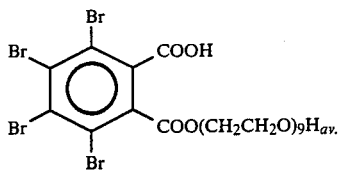

EXAMPLE 4

To 240 g (0.24 mole) of the compound of Example 3 is added 45.3 g (0.24 mole) of trimellitic anhydride and the mixture was heated at 155° C. under nitrogen for about 7 hours. The infrared spectrum indicated the completion of the reaction by the substantial disappearance of the anhydride absorption band at 5.65μ. The product was isolated in essentially quantitative yield. Analy. Calcd.; %Br, 30.3%; Mol. Wt., 1056; neutralization equivalent, 352; Found: %Br, 29.4; Mol. Wt., 1014; neutralization equivalent, 351. The spectral data was consistent with the structure:

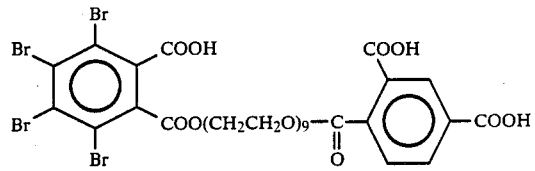

EXAMPLE 5

To 156.3 g (0.18 mole) of the compound of Example 3 is added 70.9 g (0.18 mole) 2,3-dibromopropyl trimellitate. The mixture is heated at 130°–140° C. for 6 hours with stirring to give the product as a brown opaque oil. Isolation afforded the product in essentially quantitative yield and the analysis was consistent with the structure being:

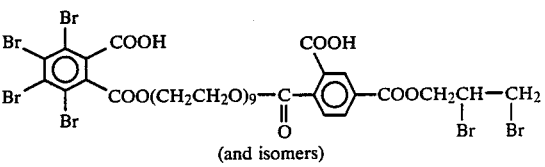
(and isomers)

EXAMPLES 6 TO 11

The following preparations were carried out as in Example 3 using the reactants set forth below.

| Example No. | Tetrabromophthalic Anhydride | Hydroxy Compound | Product Structure |
|---|---|---|---|
| 6 | 1.0 mole | HOCH₂CH₂OCH₂CH₂OH 1.0 mole | Br₄C₆-COOH, COO(CH₂CH₂O)₂H |
| 7 | 1.0 mole | HO(CH₂CH₂O)₄H (Carbowax 200) 1.0 mole | Br₄C₆-COOH, COO(CH₂CH₂O)₄H av. |
| 8 | 1.0 mole | HO(CH₂CH₂O)₁₃H (Carbowax 600) 1.0 mole | Br₄C₆-COOH, COO(CH₂CH₂O)₁₃H av. |
| 9 | 1.0 mole | HO(CH₂CH₂O)₂₃H (Carbowax 1000) 1.0 mole | Br₄C₆-COOH, COO(CH₂CH₂O)₃₃H av. |

-continued

| Example No. | Tetrabromophthalic Anhydride | Hydroxy Compound | Product Structure |
|---|---|---|---|
| 10 | 1.0 mole | HO(CH$_2$CH$_2$O)$_{45}$H (Polyglycol E-2000) 1.0 mole | [structure shown] |
| 11 | 2.0 mole | HO(CH$_2$CH$_2$O)$_9$H (Carbowax 400) 1.0 mole | [structure shown] |

EXAMPLE 12

To 96.4 g (0.2 mole) of tetrabromoterphthalic acid is added all at once 160 g (0.2 mole) of Carbowax 400 and 300 g toluene containing 1.0 g P-toluene sulfonic acid. The mixture is heated to reflux until 3.6 g (0.2 mole) water was collected. The toluene is removed under reduced pressure to give a clear viscous liquid in essentially quantitative yield.

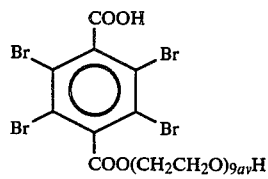

EXAMPLE 13

To 86.4 g (0.1 mole) of the compound of Example 3 is added all at once 21.8 g (0.1 mole) pyromellitic dianhydride and the mixture heated to 120°–130° C. for 2.5 hours to give the desired product. Water, 1.8 g (0.1 mole), is added to open the remaining anhydride group and the analytical data are consistent with the assigned structure:

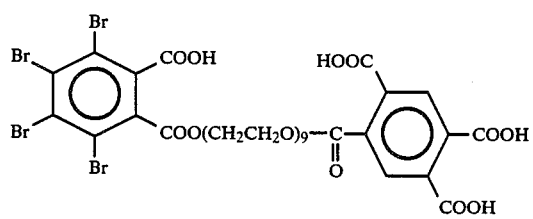

EXAMPLE 14

To 86.4 g (0.1 mole) of the compound of Example 3 is added all at once 10.9 g (0.05 mole) of pyromellitic dianhydride and the mixture heated to 120°–130° C. for 2.5 hours to give the desired product. The analytical data are consistent with the assigned structure:

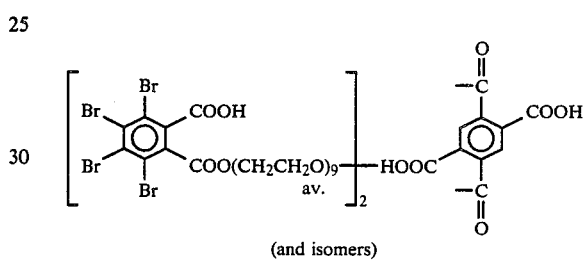

EXAMPLE 15

To 86.4 g (0.1 mole) of the compound of Example 3 is added all at once 21.8 g (0.1 mole) of phthalic anhydride and the mixture heated to 120°–130° C. for 2.5 hours to give the desired product. The analytical data are consistent with the assigned structure:

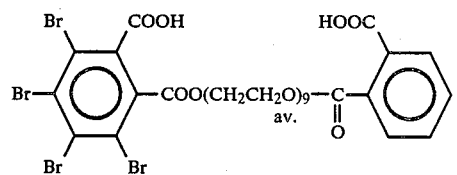

EXAMPLE 16

To 139.2 g (0.3 mole) of tetrabromophthalic anhydride is added all at once 122.9 g (0.1 mole) polyoxyethylated trimethylol propane of molecular weight 1229 and the mixture heated to 120°–130° C. for 2.5 hours to give the desired product. The analytical data are consistent with the assigned structure:

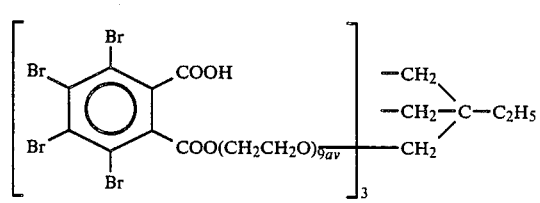

EXAMPLE 17

To 139.2 g (0.3 mole) of tetrabromophthalic anhydride is added all at once 156.8 g (0.1 mole) polyoxypropylated trimethylol propane of molecular weight 1568 and the mixture heated to 120°–130° C. for 2.5 hours to give the desired product. The analytical data are consistent with the assigned structure:

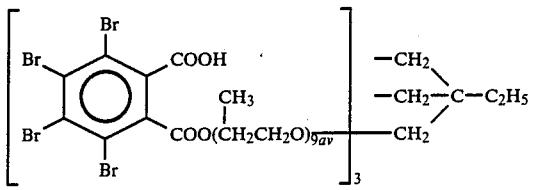

EXAMPLE 18

To 284.0 g (1.0 mole) of tetrachlorophthalic anhydride is added 350.0 g (1.0 mole) of Methoxy Carbowax 350 in presence of 7.0 g of sodium acetate. The mixture is heated at 90° C. for 8 hours in a nitrogen atmosphere. The reaction mixture is filtered hot to remove sodium acetate to give the expected product in nearly quantitative yield. The analytical data are consistent with the assigned structure:

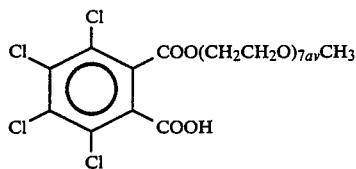

EXAMPLE 19

To 634.0 g (1.0 mole) of the composition of Example 18 is added 116 g (2.0 moles) of propylene oxide in 200 ml of toluene. The reaction mixture is heated from 60°–100° C. for 3–5 hours, and then concentrated to give the product in nearly quantitative yield. The analytical data are consistent with the assigned structure:

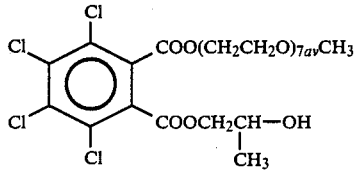

EXAMPLE 20

To 284.0 g (1.0 mole) of tetrachlorophthalic anhydride is added 200.0 g (1.0 mole) of Carbowax 200 in the presence of 7.0 g of sodium acetate. The mixture is heated at 90° C. for 8 hours in a nitrogen atmosphere. The reaction mixture is filtered hot to remove sodium acetate to generate the expected product in nearly quantitative yield. The analytical data are consistent with the assigned structure:

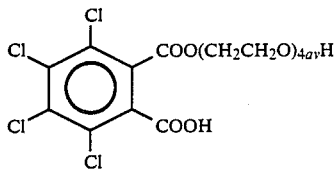

EXAMPLE 21

To 484.0 g (1.0 mole) of the product of Example 20 is added 116.0 g (2.0 mole) of propylene oxide in 200 ml of toluene. The reaction mixture is warmed at 60°–100° C. for 3–5 hours, and then concentrated to give the product in nearly quantitative yield. The analytical data are consistent with the assigned structure:

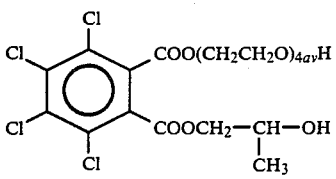

EXAMPLE 22

To 284.0 g (1.0 mole) of tetrachlorophthalic anhydride is added 400.0 g (1.0 mole) of Carbowax 400 in the presence of 7.0 g of sodium acetate. The mixture is heated at 90° C. for 8 hours in a nitrogen atmosphere. The reaction mixture is filtered hot to remove sodium acetate to generate the expected product in nearly quantitative yield. The analytical data are consistent with the assigned structure:

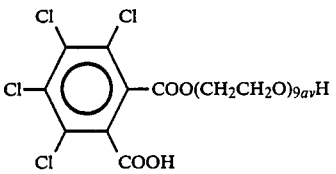

EXAMPLE 23

To 46.4 g (0.1 mole) of tetrabromophthalic anhydride is added all at once 44.1 g (0.1 mole) of polyoxyethylated dimethylamine [CH$_3$)$_2$N(CH$_2$CH$_2$O)$_{9av}$H] dissolved in 100 ml of toluene. The mixture was heated at 100°–110° C. for 4–5 hours and then concentrated to give the desired product in essentially quantitative yield. The analytical data are consistent with the assigned structure:

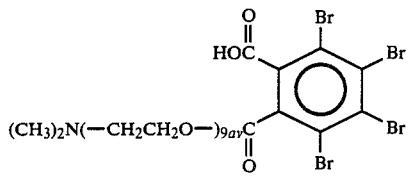

EXAMPLE 24

To 92.8 g (0.2 mole) of tetrabromophthalic anhydride is added 80.0 g (0.2 mole) of

(Jeffamine D-400) and the mixture heated to about 120° C. The final product is obtained in almost quantitative yield. The analytical data are consistent with the assigned structure:

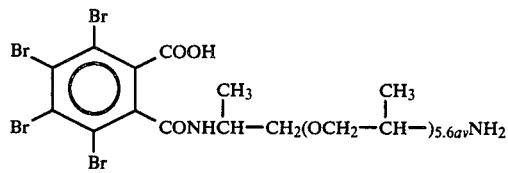

EXAMPLES 25-27

In the following examples, the flame retardancy of the tetrahalophthalate esters of this invention are demonstrated. The composition of this invention were prepared by mixing together the compound of Example 2 and a blend of 50% polyphenylene ether and 50% high impact polystyrene and then adding such to a heated Brabender mixer (270° C., 10 rpm) over a 2¾ minute period. Processing was then continued for 5¼ minutes at 25 rpm. the samples recovered from the Brabender were then pressed into plaques 4½" square and ⅛" thick on a Carver press. They were then cut into ¼" wide strips on which the Limited Oxygen Index (LOI) values were obtained according to the ASTM D2863-77 test procedure and compared to a control consisting only of the resin blend.

TABLE I

| Example No. | Resin Blend (parts) | Example 2 (parts) | Flammability LOI |
| --- | --- | --- | --- |
| 25 Control | 100 | — | 26 |
| 26 | 96 | 4 | 28 |
| 27 | 92 | 8 | 29 |

The above results demonstrate the flame retardancy of the composition of this invention relative to the control.

EXAMPLES 28-30

In the following examples, plaques containing the composition of the invention were prepared according to the above procedure except that they were 5" square and ⅛" thick. They were then cut into ½" strips on which the UL 94 vertical test procedure was run and compared to a control consisting only of a blend of 50% polyphenylene ether and 50% high impact polystyrene.

TABLE II

| Example No. | Resin Blend (parts) | Example 2 (parts) | Total Burn Time (sec.) | UL Classification |
| --- | --- | --- | --- | --- |
| 28 | 100 | — | 92 | 94 V-1 |
| 29 | 92 | 8 | 53 | 94 V-1 |
| 30 | 88 | 12 | 24 | 94 V-0 |

The above results again demonstrate the flame retardancy of the composition of this invention relative to the control.

Plaques can be prepared according to the procedures of Examples 25-30 except for substitution of the product of Examples 1 and 3-24, respectively, for the product of Example 2, and similar flame retardancy results obtained.

Similarly, the other polyphenylene ether resins disclosed in the specification hereof can be substituted for the resin used in each of the above compositions and similar improvements in flame retardancy on each control obtained.

EXAMPLES 31-33

In the following examples, the improved processability of compositions of this invention are demonstrated. The compositions of this invention were prepared by mixing together the compound of Example 2 and a blend of 50% polyphenylene ether and 50% high impact polystyrene and the melt flow properties determined on a Brabender Torque Rheometer.

TABLE III

| Example No. | Resin Blend (parts) | Example 2 (parts) | Torque at 8 min (m-g) | Temp at 8 m (°C.) |
| --- | --- | --- | --- | --- |
| 31 | 96 | 4 | 1650 | 255 |
| 32 | 92 | 8 | 1430 | 256 |
| 33 | 88 | 12 | 1220 | 255 |

The above results demonstrate the improved processability characteristics of the composition of this invention in that the decrease in melt viscosity (as measured by a decrease in the torque) is directly proportional to an increase in the level of the tetrahalophthalate ester added.

Substitution of the product of Examples 1 and 3-24, respectively, for the product of Example 2 in Examples 31-33 provides similar processability improvements.

Similarly, the other polyphenylene ether resins disclosed in the specification hereof can be substituted for the resin blend used in each of the above compositions and similar improvements in processability are observed.

EXAMPLE 34

Poly(ethylene glycol 300), 204.5 g (0.67 mole) was refluxed (T=117° C.) with 600 ml of toluene for 1.5 hours in order to remove a small amount of water present in the glycol. The mixture was cooled to about 100° C. and tetrabromophthalic anhydride, 614.5 g (1.35 moles) and sodium acetate, 1.62 g were added and the mixture was reheated to reflux and held for 25 hours. After the mixture was cooled to 50° C., propylene oxide, (156.4 g, 2.69 moles, 100% excess) was added and the mixture heated to and held at 100° C. for 2.5 hours. When the solution cooled to about 50° C. it was filtered through a bed or diatomaceus earth and decolorizing charcoal. The filtrate was distilled to remove the solvent to give 904.1 g of product as a viscous liquid. Calcd. % Br, 47.4. Found % Br, 46.5. Analytical data is consistent with the assigned structure.

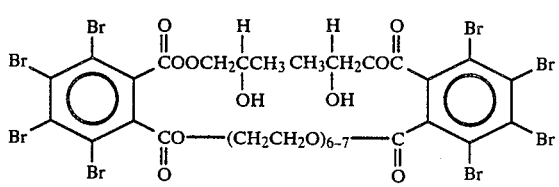

EXAMPLE 35

This compound was prepared by the procedure described in Example 34 except that poly(ethylene glycol 200) was used in place of poly(ethylene 300). Product is viscous liquid. Calcd. % Br, 51.0. Found % Br, 49.3. Analytical data was consistent with the assigned structure.

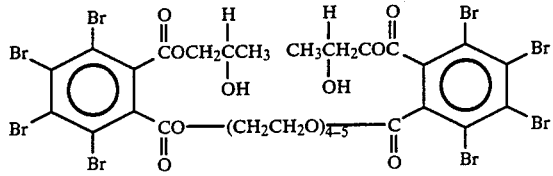

EXAMPLE 36

This compound was prepared by the procedure described in Example 34 except that poly(ethylene glycol 600) was used in place of poly(ethylene glycol 300). Product is a viscous liquid. Calcd. % Br, 39.5. Found % Br, 39.3. Analytical data is consistent with the assigned structure.

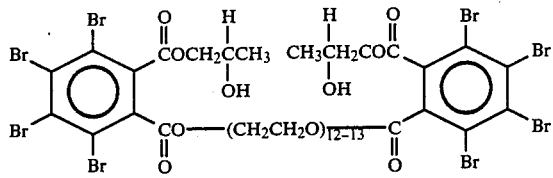

EXAMPLE 37

This compound was prepared by the procedure described in Example 34 except that poly(ethylene glycol 400) was used in place of poly(ethylene glycol 300). Product is a viscous liquid. Calcd. % Br, 44.2. Found % Br, 44.0. Analytical data is consistent with the assigned structure.

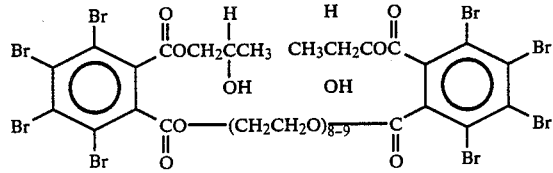

EXAMPLE 38

Methanol (54.1 g, 1.5 mole), tetrabromophthalic anhydride (695.6 g, 1.6 moles), and potassium acetate, 2.73 g were refluxed for 4 hours with 500 ml of toluene. After cooling the reaction mixture to room temperature, propylene oxide (87.12 g, 1.5 moles) were added and the mixture reacted at 80° C. for 2.5 hours. Product was obtained as a viscous liquid after distilling out the toluene. Calcd. % Br, 57.7. Found % Br, 57.2. Analytical data is consistent with assigned structure.

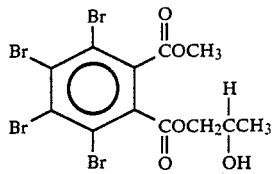

EXAMPLE 39

This compound was prepared by the procedure similar to that described in Example 38 except that methoxycarbowax 350 was used in place of methanol and ethylene oxide in place of propylene oxide. Calcd. % Br, 37.8. Found % Br, 37.2. Analytical data is consistent with assigned structure.

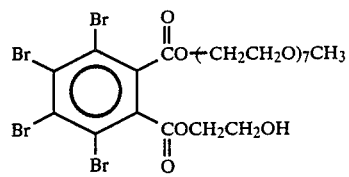

EXAMPLE 40

This compound was prepared by the procedure in Example 38 except that 2-methoxyethanol is used in place of methanol. Product is viscous liquid. Calcd. % Br, 53.6. Found % Br, 52.0. Analytical data is consistent with the assigned structure.

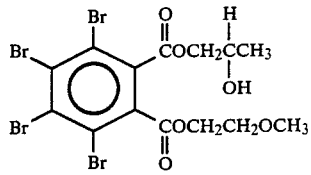

EXAMPLE 41

This compound was prepared by the procedure outlined in Example 38 except that methoxycarbowax 350 was used in place of methanol and epoxybutane in place of propylene oxide. Product is a viscous liquid. Calcd. % Br, 36.5. Found % Br, 37.2. Analytical data is consistent with the assigned structure.

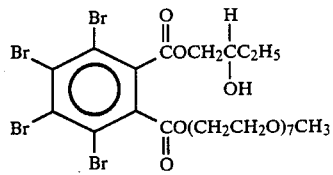

EXAMPLE 42

This compound was prepared by the procedure outlined in Example 38 except that 2-ethylhexanol-1 was used in place of methanol. Product is a viscous liquid. Calcd. % Br, 50.0. Found % Br, 52.7. Analytical data is consistent with the assigned structure.

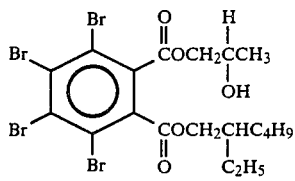

EXAMPLE 43

This compound was prepared by the procedure described in Example 39 except that stearyl alcohol was used in place of methanol. Product is a viscous liquid. Calcd. % Br, 41.0. Found % Br, 43.0. Analytical data is consistent with the assigned structure.

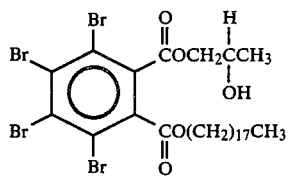

EXAMPLE 44

This compound was prepared by the procedure described in Example 38 except that 2,3-dibromopropanol-1 was used in place of methanol. Product is a viscous liquid. Calcd. % Br, 64.8. Found % Br, Col.9. Analytical data is consistent with the assigned structure.

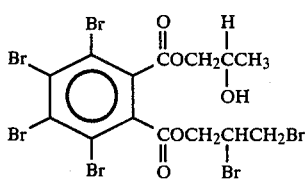

EXAMPLE 45

This compound was prepared by the procedure outlined in Example 38 except that epichlorohydrin was used in place of propylene oxide and methoxycarbowax 350 in place of methanol. Calcd. % Br, 35.7. Found % 35.4. Analytical data is consistent with the assigned structure.

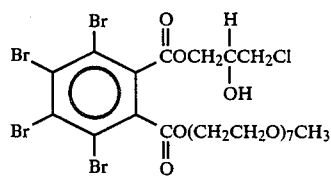

EXAMPLE 46

To a solution of methoxycarbowax 350 (300.0 g, 0.89 mole) in dry toluene (184 ml) was added sodium methoxide (48.0 g, 0.90 mole) in methanol. The methanol was then distilled off atmospherically. Tetrabromophthalic anhydride was then added (442.2 g, 0.89 mole) along with an additional 50 ml of toluene. The reaction mixture was refluxed for 2 hours and after cooling to room temperature, epichlorohydrin (106.94 g, 1.16 moles) was added. The mixture was refluxed for 20 hours. After the solvent and excess epichlorohydrin were distilled, a viscous dark product was obtained. Calcd. % Br, 37.2. Found % Br, 40.4. Analytical data is consistent with assigned structure.

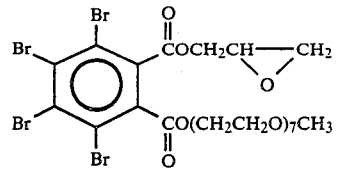

EXAMPLE 47

Methoxycarbowax 350 and toluene were refluxed for 1 hour in order to distill out a small amount of water. Tetrabromophthalic anhydride (1:1 mole ratio with methoxycarbowax 350) and sodium acetate were added and the mixture refluxed for 17 hours. After cooling to room temperature, an excess of diazomethane (prepared from the decomposition of N-methyl-N-nitroso-p-toluene sulfonamide by sodium hydroxide) in ethyl ether was added and the mixture allowed to stand overnight. The excess diazomethane was decomposed by adding acetic acid and the solvent removed by distillation. Product is viscous liquid. Calcd. % Br, 39.2. Found % Br, 37.4. Analytical data is consistent with the assigned structure.

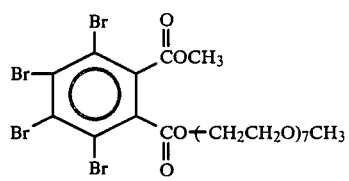

EXAMPLE 48

Di(2-ethylhexyl)tetrabromophthalate was prepared by the procedure described by Spatz et. al (I & EC Product Research and Development, Vol. 8, No. 4, 395 (1969).

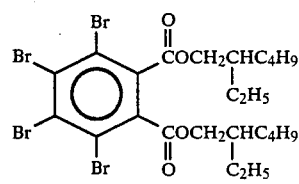

EXAMPLES 49–63

In the following examples, the flame retardancy of the compounds of this invention are demonstrated. The compositions of this invention were prepared by mixing together the compounds of Examples 34–47 (12.7 parts), antimony oxide (2.5 parts), and a blend of 50% polyphenylene oxide and 50% high impact polystyrene (84.8 parts) in a high speed mixer until the components were blended thoroughly. The compositions were then pressed into plaques which were cut up into strips measuring 4½" long×¼" wide×⅛" thick on which the Limited Oxygen Index (LOI) values were obtained according to ASTM D2863-77 procedure and compared to a control consisting only of the polyphenylene oxide-polystyrene blend.

TABLE I

| Example No. | Test Compound (Example No.) | Flammability LOI |
|---|---|---|
| 49 (Control) | | 23.8 |
| 50 | 34 | 28.6 |
| 51 | 35 | 28.2 |
| 52 | 36 | 27.6 |
| 53 | 37 | 28.8 |
| 54 | 38 | 30.0 |
| 55 | 39 | 30.0 |
| 56 | 40 | 30.4 |
| 57 | 41 | 30.4 |
| 58 | 42 | 31.0 |
| 59 | 43 | 31.0 |
| 60 | 44 | 31.8 |
| 61 | 45 | 30.0 |
| 62 | 46 | 30.4 |
| 63 | 47 | 30.4 |

The above results demonstrate the flame retardancy of the composition of this invention relative to the control.

EXAMPLES 64–78

In the following examples, the compositions of this invention were prepared as described for Examples 49–63 except that the plaques were cut into strips measuring $4\frac{1}{2}''$ long $\times \frac{1}{2}''$ wide $\times \frac{1}{8}''$ thick on which the UL94 vertical test procedures were run and compared to a control consisting of a blend of 50% polyphenylene ether and 50% high impact polystyrene.

TABLE II

| Example No. | Test Compound (Example No.) | Total Burn Time (sec.) | UL Classification |
|---|---|---|---|
| 64 (Control) | | 159 | V-2 |
| 65 | 34 | 3 | V-0 |
| 66 | 35 | 10 | V-0 |
| 67 | 36 | 18 | V-0 |
| 68 | 37 | 5 | V-0 |
| 69 | 38 | 1 | V-0 |
| 70 | 39 | 7 | V-0 |
| 71 | 40 | 5 | V-0 |
| 72 | 41 | 8 | V-0 |
| 73 | 42 | 1 | V-0 |
| 74 | 43 | 2 | V-0 |
| 75 | 44 | 2 | V-0 |
| 76 | 45 | 4 | V-0 |
| 77 | 46 | 3 | V-0 |
| 78 | 47 | 7 | V-0 |

The above results again demonstrate the flame retardancy of the compositions of this invention relative to the control.

EXAMPLE 79

Poly(ethylene glycol 600), 885.4 g (1.40 moles), tetrabromophthalic anhydride, 1298.4 g (2.80 moles), potassium acetate, 1.35 g, and toluene (1000 g) were charged into a one-gallon glass-lined reactor and heated to 120° C. After 4 hours at this temperature, ethylene oxide, 246.68 g (5.60 moles) was pumped into the reactor in ¾ hour while maintaining the temperature at 120° C. After one hour longer of heating, the mixture was cooled to room temperature, the excess ethylene oxide was then vented, and the product collected. After stripping off the toluene, 2250 g of the product was isolated in 99% yield as a viscous liquid. Calcd. % Br, 39.2. Found % Br, 38.8. Analytical data is consistent with the assigned structure.

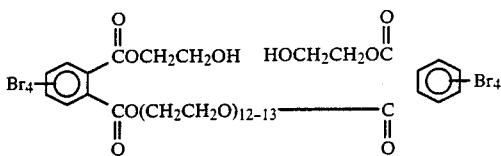

EXAMPLE 80

To the product of Example 79, 453.8 g (0.27 mole), acetic anhydride, 83.4 g (0.82 mole), potassium acetate, 1.0 g, and toluene, 400 ml, were refluxed for 8 hours. After cooling to room temperature, the reaction mixture was transferred to a separatory funnel and extracted first with 100 ml of a 16% potassium bicarbonate solution and then with 100 ml of water. After distilling off the solvent, 335.0 g (64% yield) of product was obtained as a viscous liquid. Calcd. % Br, 36.8. Found % Br, 32.9. Analytical data is consistent with the assigned structure.

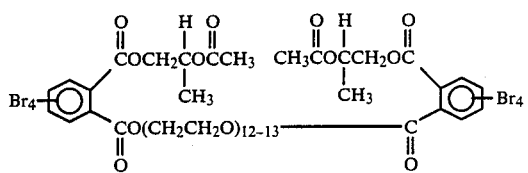

EXAMPLE 81

Tetrabromophthalic anhydride, 231.9 g (0.50 mole), 2-ethylhexanol, 130.2 g (1.0 mole), and potassium acetate, 0.24 g were heated to and kept at 120° C. for 4 hours. The mixture was cooled to 60° C. and potassium carbonate, 35.9 g (0.26 mole), was added. Reheated mixture to 80° C. and kept it at this temperature for 2 hours. Cooled mixture to 60° C. and added triethylamine, 14.2 g (0.14 mole). Reheated mixture to 70° C. and added methyl iodide, 113.6 g (0.8 mole) in 20 minutes. Heated mixture to 70°–75° C. and kept it at this temperature for 2½ hours. Cooled mixture to room temperature and filtered it in order to remove by-product potassium iodide. The filtrate was distilled to remove toluene and 290 g of crude product was collected as a pale yellow liquid. Extracted this product with 3 times 100 ml of a 6.5% potassium carbonate solution followed by 2 times 100 ml of water and once with a 30% sodium chloride solution. Dried the organic phase over anhydrous magnesium sulfate overnight. Filtered off magnesium sulfate and after removing the solvent from filtrate by distillation, 204 g of product was obtained in 67% yield as a pale yellow liquid. Calcd. % Br, 52.6. Found % Br, 52.2. Analytical data is consistent with the assigned structure.

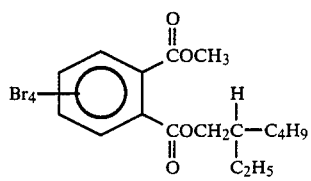

EXAMPLE 82

Tetrabromophthalic anhydride, 231.9 g (0.5 mole), 2-[2-methoxyethoxy]-ethanol, 360.5 g (3.0 moles), stannous oxalate, 2.32 g, and xylene, 200 ml, were refluxed (temp. 160° C.) for 18 hours during which time, theory water was collected. The xylene and excess 2-[2-methoxyethoxy]-ethanol were distilled under reduced pressure to give 332 g of crude product as a wet white solid. Redissolved 256 g of this material in toluene (1000 ml) and extracted it with 3 times 200 ml of a 7.5% potassium bicarbonate solution followed by one extraction with 200 ml of water. Dried the organic phase with anhydrous magnesium sulfate overnight. After removing the magnesium sulfate by filtration, toluene was removed by distillation to give 45 g of a yellow liquid product. Overall yield is 17%. Calcd. % Br, 46.6. Found % Br, 45.7. Analytical data is consistent with the assigned structure.

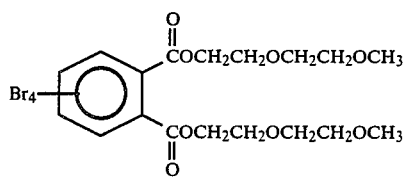

EXAMPLE 83

This compound was prepared by the procedure outlined in Example 82 except that 2-[2-ethoxyethoxy]-ethanol was used in place of 2-[2-methoxyethoxy]-ethanol.

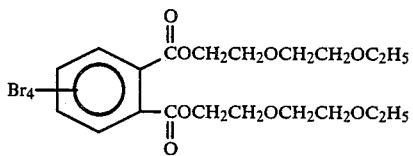

EXAMPLE 84

This compound was prepared by the procedure outlined in Example 79 except that docosyl alcohol (behenyl alcohol) was used in place of poly(ethylene glycol 600) and propylene oxide in place of ethylene oxide. Product is a viscous liquid. Calcd. % Br, 37.7. Found % Br, 36.5. Analytical data is consistent with the assigned structure.

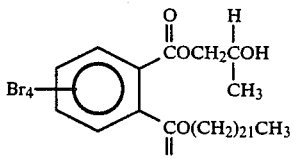

EXAMPLE 85

This compound was prepared by the procedure outlined in Example 79 except that tricontyl alcohol was used in place of poly(ethylene glycol 600) and propylene oxide in place of ethylene oxide. Product is a viscous liquid.

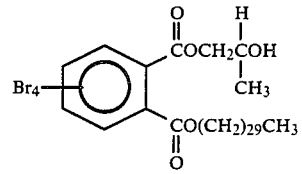

EXAMPLE 86

This compound was prepared by the procedure outlined in Example 82 except that methoxycarbowax 550 was used in place of 2-[2-methoxyethoxy]-ethanol.

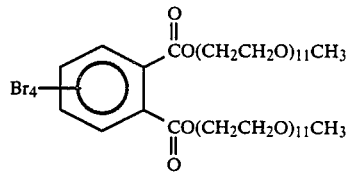

TABLE I

| Example No. | Examples 87–90 Test Compound (Example No.) | Flammability LOI |
|---|---|---|
| 87 | 48 | 32.0 |
| 88 | 79 | 30.4 |
| 89 | 80 | 30.0 |
| 90 | 81 | 31.3 |

TABLE II

| Example No. | Examples 91–94 Test Compound (Example No.) | Total Burn Time (sec) | UL Classification |
|---|---|---|---|
| 91 | 48 | 18 | V-0 |
| 92 | 79 | 19 | V-0 |
| 93 | 80 | 84 | V-1 |
| 94 | 81 | 15 | V-0 |

I claim:
1. A flame retardant composition comprising
(i) a polyphenylene ether resin selected from the group comprising
(1) a homopolymer having repeated structural units of the formula:

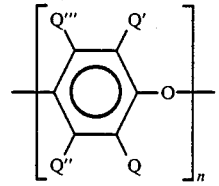

where Q, Q', Q", and Q'" are independently selected from the group consisting of hydrogen, hydrocarbon radicals, halohydrocarbon radicals having at least two carbon atoms between the halogen atom and phenyl nucleus, and Q', Q", and Q'" in addition may be halogen; and n represents the total number of monomer units and is an integer of at least 10;
(2) a copolymer with repeating units

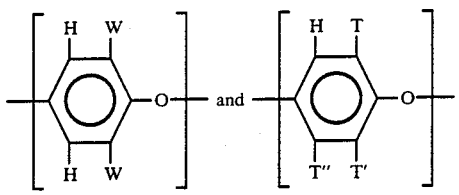

wherein W may be methyl, Cl, Br, or I; and T, T' and T" may independently be alkyl of 1 to 3 carbons or aryl, alkaryl, haloaryl, arylalkyl of 6 to 12 carbons; or (3) blends of (1) or (2) with
(a) vinyl aromatic resins wherein at least 10% by weight of the blend is derived from a vinyl aromatic monomer of the compound having the formula:

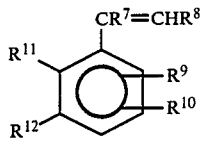

wherein $R^7$ and $R^8$ are independently selected from the group consisting of lower alkyl or alkenyl groups of from 1 to 6 carbon atoms and hydrogen; $R^9$ and $R^{10}$ are independently selected from the group consisting of chloro, bromo, hydrogen, and lower alkyl of from 1 to 6 carbon atoms; $R^{11}$ and $R^{12}$ are independently selected from the group consisting of hydrogen and a lower alkyl or alkenyl group of 1 to 6 carbon atoms or $R^{11}$ and $R^{12}$ may be concatenated together with hydrocarbyl groups to form a naphthyl group; or (b) copolymers of the vinyl aromatic monomer of (i)(3)(a) above with materials having the general formula:

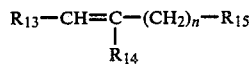

wherein $R_{13}$ and $R_{14}$ represent a substituent independently selected from the group consisting of hydrogen, halogen, an alkyl group of 1 to 4 carbon atoms, carboalkoxy or $R_7$ and $R_8$ taken together represent an anhydride linkage of the structure —COOOC— and $R_{15}$ is hydrogen, vinyl, an alkyl or alkenyl group having 1 to 12 carbon atoms, cycloalkyl, carboalkoxy, alkoxyalkyl, alkyl carboxy, ketoxy, halogen, carboxy, cyano or pyridyl and n is a whole number within the range of 0 to 9; and (ii) a flame retarding effective amount of a tetrahalophthalate ester flame retardant processing aid of the formula:

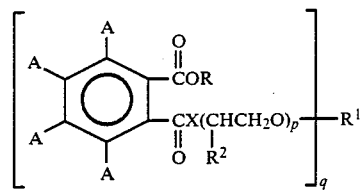

wherein:
(a) R is selected from the group consisting of hydrogen, an alkyl or substituted alkyl of 1 to 30 carbons, hydroxyalkyl of 2 to 20 carbons, polyhydroxyalkyl of 3 to 10 carbons, and

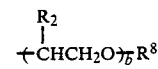

where $R^8$ is an alkyl or substituted alkyl of 1 to 18 carbons, and b is 1 to 50;

(b) $R^1$ is selected from the group consisting of hydrogen, an alkyl or substituted alkyl of 1 to 30 carbons, alkenyl or substituted alkenyl of 2 to 22 carbons,

where $R^7$ is an alkyl of 1 to 18 carbons; a polyhydroxyalkyl of 3 to 12 carbons;

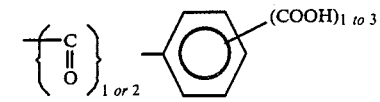

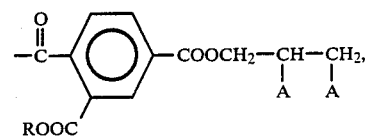

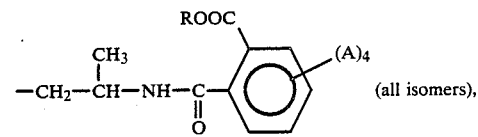

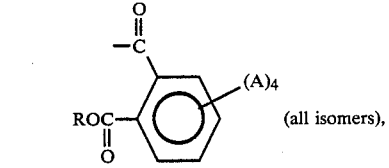

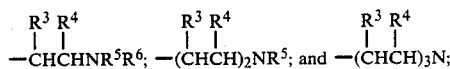

with the proviso that the valence of $R^1$ is equal to q;

(c) $R^2$ is independently selected from the group consisting of H and $CH_3$;

(d) $R^3$, $R^4$, $R^5$, and $R^6$ are independently selected from the group consisting of H and an alkyl of 1 to 18 carbons;
(e) p is an integer of 0 to 50;
(f) q is an integer of 1 to 6;
(g) X is selected from the group consisting of O or NH; and
(h) A is selected from the group consisting of Cl or Br; and
(i) provided further that when p is zero and X is oxygen that R and $R^1$ are other than a neopentyl group.

2. The composition of claim 1 wherein p is zero, and q is one and X is oxygen.

3. The composition of claim 2 wherein R and $R^1$ are alkyl groups and A is Br.

4. The composition of claim 3, di-2-ethylhexyl tetrabromophthalate.

5. The compositions of claim 1 wherein the weight ratio of (i) to (ii) is within the range of about 100:1 to about 2:1.

6. The composition of claim 1 wherein said polyphenylene ether resin of (i) is a blend of the homopolymer of (1) and a vinyl aromatic resin of (3) wherein at least 10% by weight of the blend is the vinyl aromatic resin.

7. The composition of claim 6 wherein said polyphenylene ether of (i) is a blend of the homopolymer of (1) and polystyrene or a blend of the homopolymer of (1) and a copolymer of styrene and 1,3-butadiene.

8. The composition of claim 1 wherein said polyphenylene ether is a homopolymer of (1).

9. The composition of claim 1 wherein in said tetrahalophthalate ester of (ii) R is an alkyl or substituted alkyl of 1 to 10 carbons, A is Br, X is oxygen, p is 0 to 20, and q is 1 to 6.

* * * * *